United States Patent [19]

Yoshioka et al.

[11] Patent Number: 4,523,410

[45] Date of Patent: Jun. 18, 1985

[54] COMPOSITE GUIDE MECHANISM

[75] Inventors: Junichi Yoshioka; Koichi Koizumi, both of Chiba; Akira Kanai; Kazuo Shiba, both of Tokyo, all of Japan

[73] Assignee: Citizen Watch Co., Ltd., Japan

[21] Appl. No.: 564,782

[22] Filed: Dec. 27, 1983

Related U.S. Application Data

[63] Continuation of Ser. No. 287,040, Jul. 27, 1981, abandoned.

[30] Foreign Application Priority Data

Aug. 18, 1980 [JP] Japan ................................ 55-113124

[51] Int. Cl.³ ............................................. B24B 41/00
[52] U.S. Cl. .................................. 51/166 R; 308/5 R
[58] Field of Search ........ 51/166 R, 166 TS, 166 MH; 74/DIG. 1; 254/93 A; 308/5 R; 384/97, 100; 409/100, 102, 212, 241

[56] References Cited

U.S. PATENT DOCUMENTS

| | | | |
|---|---|---|---|
| 2,235,092 | 3/1941 | Wall | 409/102 |
| 3,279,288 | 10/1966 | Mannaioni | 409/102 X |
| 3,298,283 | 1/1967 | Bullard | 409/102 X |
| 3,855,901 | 12/1974 | Girardi | 308/5 R X |
| 3,903,993 | 9/1975 | Vorhees et al. | 308/5 R X |
| 4,114,959 | 9/1978 | Christ | 308/5 R |

Primary Examiner—E. R. Kazenske
Assistant Examiner—William Fridie, Jr.
Attorney, Agent, or Firm—Bernard, Rothwell & Brown

[57] ABSTRACT

In a machine tool such as a surface grinding machine or the like, a guide mechanism for the machine tool wherein one of a pair of opposed guideways is formed into a hydrodynamic guideway, whilst the other guideway is formed into a hydrostatic guideway, the hydrodynamic guideway is utilized as only one master guide, and on the other hand, the hydrostatic guideway is made to act in such that a moving body is pushed onto the hydrodynamic guideway with a constant pressure, so that this arrangement makes uniform the contact pressure distribution in the hydrodynamic guideway, thus the posture of the moving body is improved thereby making the same to perform precision linear motion.

5 Claims, 9 Drawing Figures

COMPOSITE GUIDE MECHANISM

This is a continuation of application Ser. No. 287,040 filed July 27, 1981 now abandoned.

BACKGROUND OF THE INVENTION

1. Field of the Invention

This invention relates to a composite guide mechanism for machine tools, and more particularly to a guideway mechanism in which one of a pair of opposed guideways is formed into a hydrodynamic guideway and the other guideway is formed into a hydrostatic guideway.

2. Description of the Prior Art

In a conventional vertical guide mechanism which is formed into a pair of opposed hydrodynamic guideways, the momental external force acts on its moving body, and so the moving body inclines with respect to its guideways and a non-uniform contact pressure distribution generates in the guideways, so that the moving body partially contacts with the guideway in a non-uniform state, because the clearance exists between guideway and moving body. In an extreme case, both the metals mutually contact to each other, so that the wear thereof is accelerated.

Furthermore, in a conventional guide mechanism, two opposed master guides exist in guideways, and either of the guideways becomes a master guide depending upon the external force which functions onto the moving body. In this case, since the master guide is not constant, an unstable motion of the moving body occurs, so that it has been difficult to effect the precise positioning.

Moreover, when a conventional opposed guideway mechanism is compared with an opposed hydrostatic guideway, the former mechanism has a smaller frictional force, so that disadvantageous phenomena such as one-sided contact and the like are difficult to occur. In this case, however, since the frictional force is small, the effects for controlling vibration due to friction cannot absolutely be expected. Besides the above facts, the opposed guideway mechanism receives substantially the external force being applied to the moving body by means of the driving system, and as a consequence, the moving body is unnecessarily displaced, so that precision of the positioning has deteriorated.

SUMMARY OF THE INVENTION

It is a principal object of the present invention to provide a very useful guide mechanism by which disadvantages of the conventional guide mechanisms as mentioned above can be overcome.

Another object of the invention is to provide a guide mechanism in which a moving body moves on its guideway as the only one master guide, whereby uniformalization of the contact pressure distribution is achieved in the guideway, so that the unstable motion can be suppressed.

A further object of the invention is to provide a guide mechanism to which damping effect in the driving direction is given by means of the frictional force generated in its guideway.

The above and other objects as well as advantages of the present invention will be fully understood by referring to the following descriptions setting forth preferred embodiments of the invention in connection with the accompanying drawings.

PREFERRED EMBODIMENTS OF THE INVENTION

Figure 1:
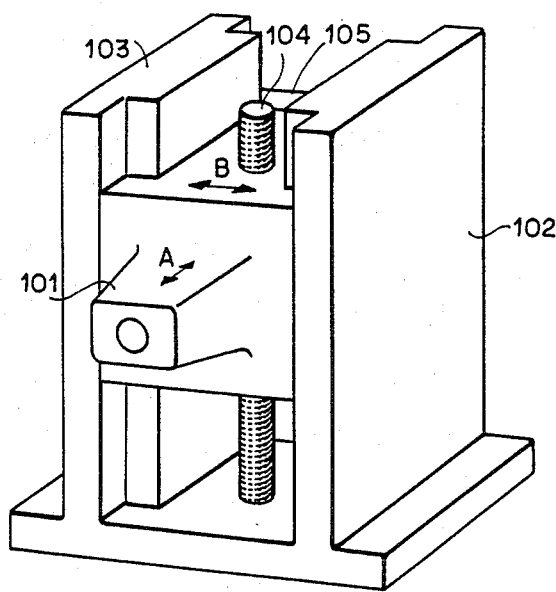
FIG. 1 is a perspective view showing an embodiment of the vertical guide plane in a surface grinding machine according to the present invention.

FIG. 1 is a perspective view showing the vertical guide plane of a surface grinding machine according to the present invention in which reference numeral 101 designates a housing for a grinding wheel spindle on the extreme end of which a grinding wheel (not shown) is to be mounted. The housing 101 for the grinding wheel spindle is guided by columns 102 and 103, and is moved up and down by means of a feed screw 104. A guideway plate 105 is bolted to the housing 101 for the grinding wheel spindle by means of bolts 209 (FIG. 2).

In the present embodiment, it is to be noted that this invention is merely applied in the direction of arrow A, while the conventional hydrodynamic guideway is adopted in the direction of arrow B. This is because the direction of arrow B is substantially symmetrical with respect to the feed screw 104, so that it may be considered that the driving point coincides geometrically with the center of gravity of the moving body. Furthermore when the invention is also applied in the direction of arrow B, a more favorable precision of movement can be attained.

Figure 2:
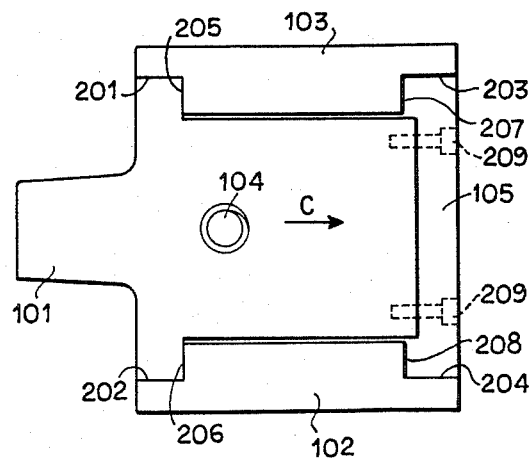
FIG. 2 is an explanatory planar view showing an arrangement of the guideway of FIG. 1.

FIG. 2 is a planar view showing the guide plane of FIG. 1 in which the identical portions are designated by the identical reference numerals as in FIG. 1, reference numerals 201 through 206, inclusive, designate hydrodynamic guideway parts, and 207 and 208 hydrostatic guideway parts, respectively. More specifically, the hydrodynamic guideway parts 205 and 206 are combined with the hydrostatic guideway parts 207 and 208, respectively, in this embodiment. The housing 101 for grinding wheel spindle is secured to the guideway plate by means of the bolts 209.

Figure 3:
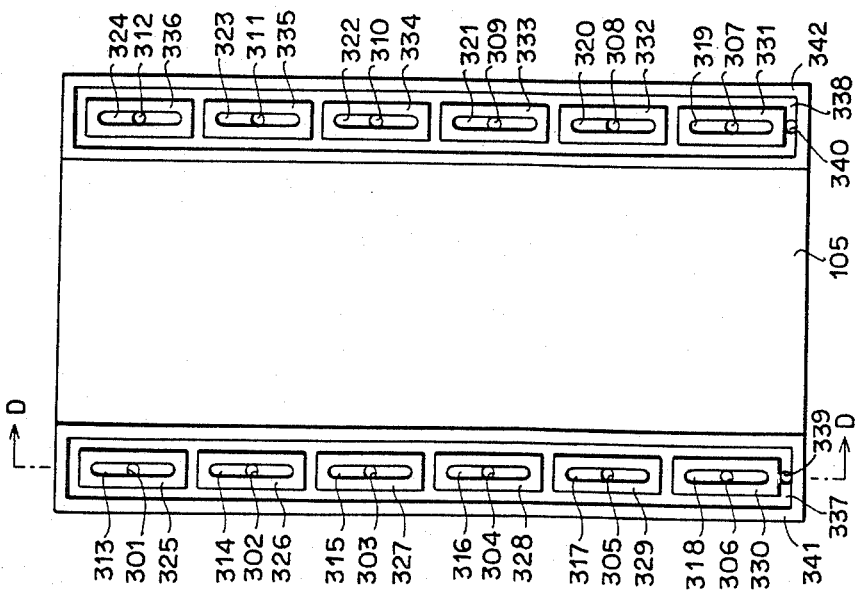
FIG. 3 is a front view showing the arrangement of hydrostatic pad of the guideway plate viewed from the direction of arrow C in FIG. 2.

FIG. 3 is a front view showing a guideway portion of the guideway plate 105 viewed from the direction of arrow C in FIG. 2 in which reference numerals 301 through 312, inclusive, designate hydraulic supply nozzles, 313 through 324, inclusive, hydrostatic recesses, 325 through 336, inclusive, lands, 337 and 338 oil return channels, 339 and 340 oil return holes, respectively. In this arrangement, it is to be understood that each of the supply nozzles 301 through 312 is formed into an identical shape to that of the other supply nozzles, and each of the hydrostatic recesses 313 through 324 as well as each of the lands 325 through 336 are formed into the respective identical shapes to those of the other recesses and lands, respectively. The lands 325 to 326 are formed with the same height as that of the outside edges 341 and 342, and on one hand, the recesses 313 to 324 are carved with a lower level than that of the lands 325 to 326. The channels 337 and 338 for return oil are also carved with a lower height than that of the outside edges 341 and 342 in order to return the oil. The oil supplied from the supply nozzles 301 through 312 maintains the pressure at the time when the oil was supplied in the hydrostatic recesses 313 through 324, and the oil passes through the return channels 337 and 338 while reducing the pressure during the transit of the oil via the lands 325 and 326, and further the oil is recovered by a hydraulic tank 410 by way of the return holes 339 and 340.

Figure 4:
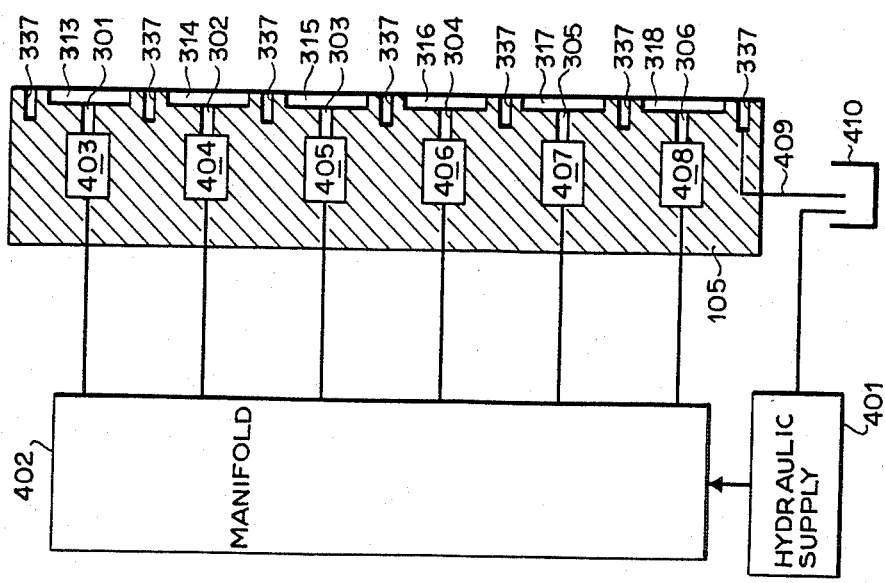
FIG. 4 is a view showing the cross section of the guideway plate taken along line D—D in FIG. 3.

FIG. 4 is a view illustrating the cross section of the guideway plane taken along line D—D in FIG. 3 in which reference numeral 105 designates a static pressure sliding plate, 401 a hydraulic source, 402 a manifold, 403 through 408, inclusive, restrictors, 313 through 318, inclusive, recesses, 301 through 306, inclusive, supply nozzles, 337 return channels, 409 a return piping, and 410 a tank, respectively. The port between recesses and return channel is a land. The oil is supplied from the hydraulic supply 401 to the recesses through the manifold 402, and then the oil reaches the recesses 313 through 318 by way of the restrictors 403 through 408. Furthermore such arrangement that a pressure regulating valve or servo valve is interposed between the manifold 402 and each of the restrictors 403 to 408 thereby regulating the pressure in each of the recesses may be adopted in this embodiment.

The explanation has been made hereinabove in connection with the vertical guide type, but, in horizontal guide type, since two master guides in respect of the side face in hydrodynamic guide mechanism exist similarly to those in the aforementioned vertical hydrodynamic guide mechanism, the moving body exhibits an unstable behavior, so that precision of movement or positioning deteriorates. Moreover, there are the problems as mentioned above in also guideway type. It is, however, possible to elevate the precision of movement or positioning of the moving body and to improve the damping effect for vibration in its driving direction.

Further, in a surface grinding machine of table reciprocating type according to hydrodynamic guide mechanism, an oil film thickness existing between the table and guide surface varies in accordance with the reciprocating motion of the table, so that machining accuracy is influenced by the variation.

Figure 5:
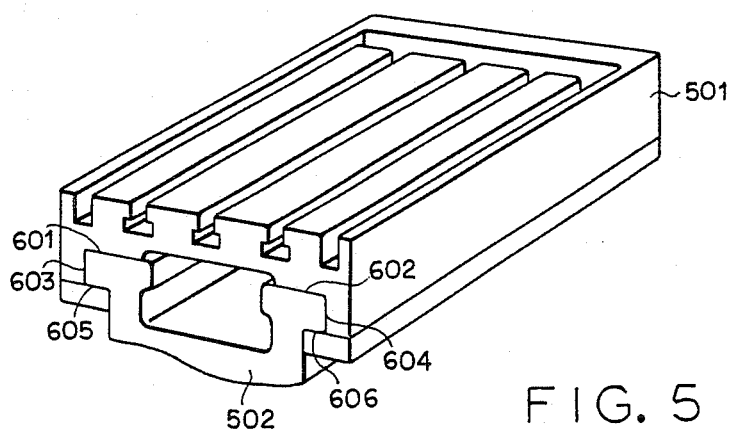
FIG. 5 is a perspective view showing a table in the section of another embodiment according to the invention.

FIG. 5 is a perspective view showing a table and guide surface in the cross section to which the present invention is applied wherein a reference numeral 501 designates a table, 502 a saddle (guide surface), 601 through 604, inclusive, hydrodynamic guide mechanisms, and 605 and 606 hydrostatic guide mechanisms, respectively.

When the present invention is applied to this embodiment, an unstable motion due to the variation in an oil film thickness and the like can be suppressed and as a consequence, machining accuracy can be improved.

Figure 6:
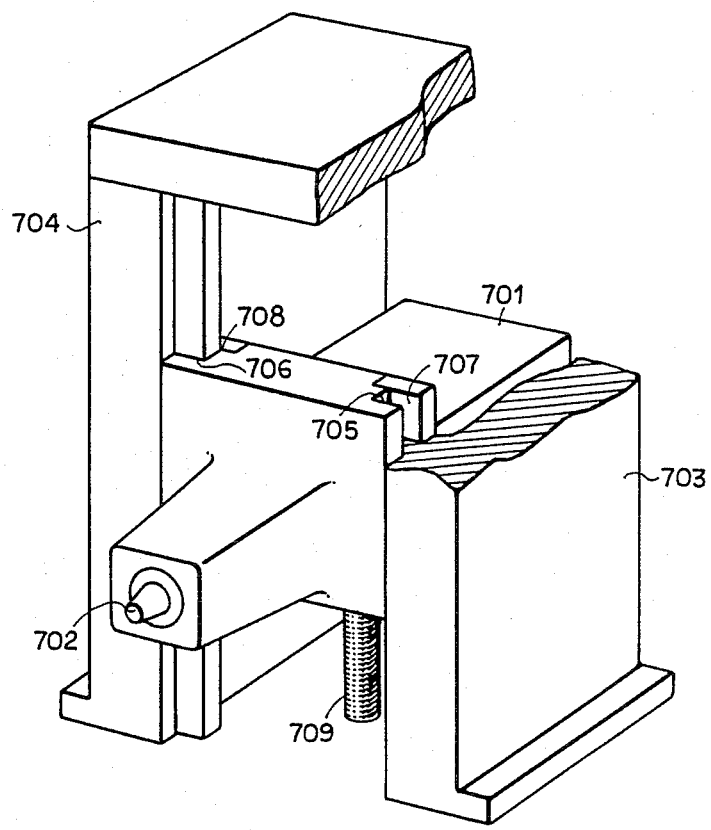
FIG. 6 is a perspective view showing an experimental apparatus of a modified embodiment in accordance with the invention.
Figure 7:
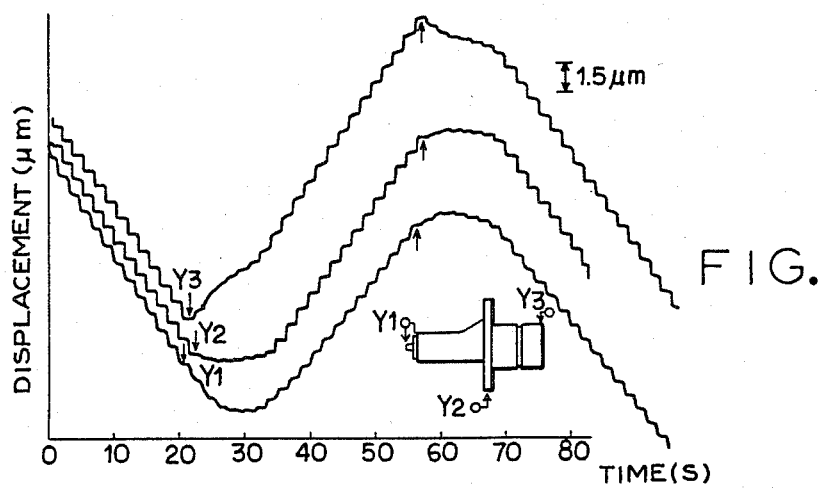
FIG. 7 is a graphical representation illustrating changes of the posture of a housing (moving body) in the driving direction at the time of reversing thereof in the conventional guide mechanism by means of hydrodynamic guideways.

Then, the experimental results obtained by utilizing the apparatus illustrated in FIG. 6 will be described hereinbelow. FIG. 6 is a perspective view showing the experimental apparatus partly in section which is different from the surface grinding machine shown in FIG. 1 in the width before and behind the guide portion, but no essential difference is observed in the principle and operations in respect of the invention wherein a reference numeral 701 designates a housing, 702 a grinding wheel spindle, 703 and 704 columns 705 through 708, inclusive, guideways, and 709 a feed screw, respectively. The housing 701 for the grinding wheel spindle is guided by the columns 703 and 704 and is driven by the feed screw 709. In this apparatus, the guideways 705 and 706 are formed into hydrodynamic guide mechanism, while the guideways 707 and 708 are formed into hydrostatic guide mechanism. The constructional elements of the experimental apparatus employed are as follows:

Weight of the Housing (moving body): 220 kgf
Area of the Sliding Surface (moving body): 330 cm$^2$
Effective Area of Hydrostatic Pad (moving body) 140 cm$^2$ FIG. 7 is a graphical representation illustrating changes of the posture of the housing in the driving direction at the time of reversing thereof in the case where the guideways 707 and 708 are formed into a conventional hydrodynamic guide mechanism type. This graphical representation exhibits the fact to the effect that even if 0 and 0.75 $\mu$m intermittent feed is given at the reversing of the housing by turning the situation from downward driving to upward driving, the stick due to elastic deformation (including the backlash in the driving mechanism) occurs in the housing, and there is a dead zone at the driving point (point $Y_2$) of the housing, whilst there is a sinking in the downward direction in the side of the grinding wheel (point $Y_1$) and the rear end (point $Y_3$) elevates in the upward direction. This phenomenon indicates changes of the inverse posture at the time of the next reversing, but it does not necessarily return to the former state and as a result, an unstable behavior of the movement is observed.

Figure 8:
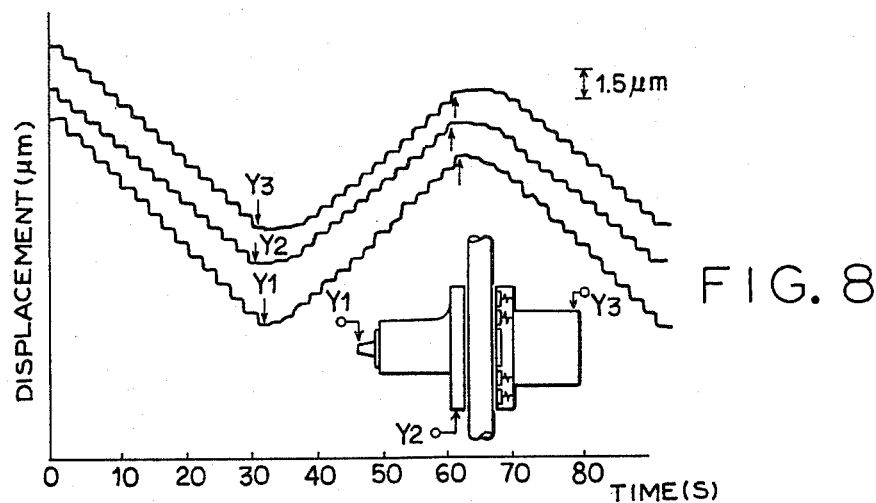
FIG. 8 is a graphical representation showing changes of the posture of a housing for grinding wheel spindle in the driving direction at the time of reversing thereof in the present guide mechanism of the invention.

FIG. 8 is a graphical representation showing changes of the posture of the housing in the case according to the guide mechanism of the present invention. The experiment was effected by such mechanism that supply pressure of hydrostatic guideway was adjusted so as to be a contact pressure of the sliding surfaces with 0.5 kgf/cm$^2$ in the front housing. In also this case, since there is a backlash similarly to that in the aforementioned case, a dead zone generates at the driving point. However, this case differs from the case where only sliding surfaces are adopted, and the improvement in stable precision of the movement according to the present invention is observed in the behavior of the motion for the housing.

Figure 9:
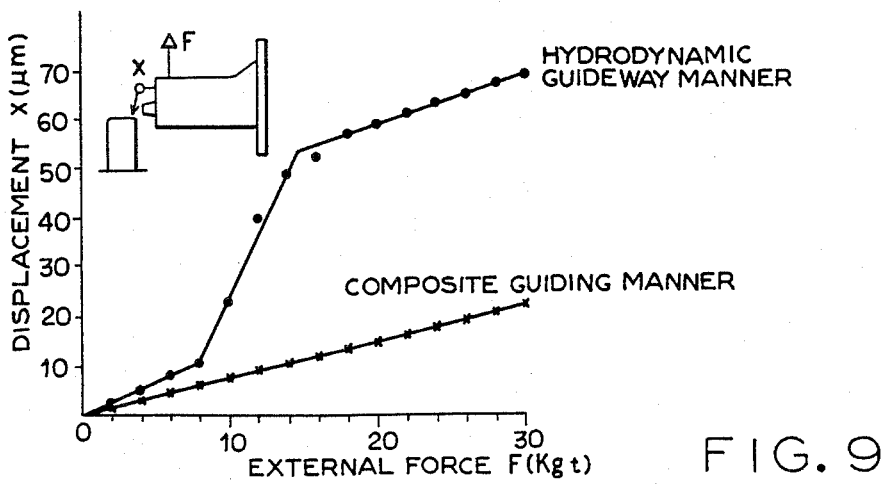
FIG. 9 is a graphical representation illustrating a rigidity at the extreme end of a grinding wheel spindle in the combination of the conventional guide mechanism by means of hydrodynamic guideways and the present guide mechanism of the invention.

Furthermore, FIG. 9 is a graphical representation showing a rigidity at the time when momental external force is applied to the extreme end of the grinding wheel spindle in case of stopping the housing. In the conventional guide mechanism, non-linear characteristics depending on the momental external force appear, so that deterioration of the rigidity is observed, whilst in the mechanism of this invention the non-linear characteristics appearing in the conventional guide mechanism disappear, since a constant contact pressure has been applied on the guideways even in case of stopping the housing for grinding wheel spindle in the guiding mechanism according to the present invention, so that the overall rigidity is improved. More specifically, since the effects of hydrodynamic effect do not generate at the time of stopping the housing, non-linear characteristics of the rigidity appear in principle in the conventional guide mechanism, and on the contrary, the present invention can make non-linear characteristics to disappear as apparent from these experimental results.

As described above, in the present invention, one of a pair of opposed guideways is formed into a hydrodynamic guideway and the other guideway is formed into hydrostatic guideway, the hydrodynamic guideway is utilized as only one master guide, while the hydrostatic guideway is made to act in such a manner that a moving body is pushed onto the hydrodynamic guideway with a constant pressure, so that this arrangement makes uniform the contact pressure distribution in the hydrodynamic guideway, thus the posture of the moving body is improved, thereby performing precision linear motion. In addition, the present invention can decrease an nonuniform wear on the sliding surfaces and afford damping effect in the driving direction. Therefore, the precision in movement or positioning of a moving body can be improved in accordance with the present invention.

What is claimed is:

1. A guide mechanism for a surface grinding machine including a sliding body comprising:
   (a) a pair of columns disposed on the main body of said surface grinding machine opposite to each other;
   (b) a feed screw provided between said columns along the same direction thereof;
   (c) a housing for a grinding wheel spindle having a mounting portion which is driven by said feed screw and on which the grinding wheel is mounted in the direction perpendicular to that of said feed screw;
   (d) a guideway plate attached to said housing for said grinding wheel spindle by means of a securing means in the reverse side of said mounting portion of the housing;
   (e) the guideways of said respective elements composed of a hydrodynamic guideway and a hydrostatic guideway which are arranged in opposed relationship and vertically;
   (f) said hydrodynamic guideway being continuously and intermittently supplied on the slide surface thereof with lubricant so as to wet or infiltrate the slide surface;
   (g) said hydrostatic guideway provided with a plurality of hydrostatic recesses arranged in the moving direction so as to form an oil film between the guide surface and slide surface thereof by supply of oil under pressure; and
   (h) means for supplying said oil under pressure to said hydrostatic recesses so as to press said sliding body toward said hydrodynamic guideway through the oil film thereon under a substantially constant pressure, said hydrodynamic guideway acting as the only master guide;
   said means including restrictors for regulating the pressure in said recesses.

2. A guide mechanism for machine tools including a sliding body comprising:
   (a) composite guideways for said sliding body composed of a hydrodynamic guideway and a hydrostatic guideway which are arranged in opposed relationship and vertically;
   (b) said hydrodynamic guideway being continuously and intermittently supplied on the slide surface thereof with lubricant so as to wet or infiltrate the slide surface;
   (c) said hydrostatic guideway provided with a plurality of hydrostatic recesses arranged in the moving direction so as to form an oil film between the guide surface and slide surface thereof by supply of oil under pressure; and
   (d) means for supplying said oil under pressure to said hydrostatic recesses so as to press said sliding body toward said hydrodynamic guideway through the oil film thereon under a substantially constant pressure, said hydrodynamic guideway acting as the only master guide;
   (e) said means including restrictors for regulating the pressure in said recesses.

3. The guide mechanism as claimed in claim 2, wherein said composite guideways are arranged in orthogonal directions to each other.

4. A guide mechanism as claimed in claim 2, wherein said guideways are constructed in the horizontal direction.

5. A guide mechanism as claimed in claim 4, wherein said guideways are constructed between a fixed saddle and a movable horizontal table in the moving direction for supplying a pressure oil through a throttle to form an oil film between a guiding surface and said sliding surface;
   said hydrodynamic guideway and said hydrostatic guideway being vertically opposed.

* * * * *